United States Patent [19]

Daly

[11] Patent Number: 4,927,986

[45] Date of Patent: May 22, 1990

[54] CONDUCTIVE STYLUS STORAGE FOR A PORTABLE COMPUTER

[75] Inventor: John J. Daly, San Carlos, Calif.

[73] Assignee: GRID Systems Corporation, Fremont, Calif.

[21] Appl. No.: 364,951

[22] Filed: Jun. 12, 1989

[51] Int. Cl.[5] .............................. G08C 21/00
[52] U.S. Cl. ...................................... 178/18
[58] Field of Search .................... 178/18, 19; 340/706; 346/139 C

[56] References Cited

U.S. PATENT DOCUMENTS 4,492,819 1/1985 Rodgers et al. ...................... 178/18

Primary Examiner—Stafford D. Schreyer
Attorney, Agent, or Firm—Townsend and Townsend

[57] ABSTRACT

A hand held computer having a display screen which accepts writing from an electronic pen-type stylus has a cord which tethers the stylus to the computer. At the periphery of the computer is a flange or ledge forming a peripheral groove within which the cord resides when the stylus is stored in another wider part of the peripheral groove. The groove has a widened notch for receiving a larger-diameter portion of the stylus, such that the stylus snaps into a prescribed position lengthwise in the groove. In a preferred embodiment the cord is connected into the stylus via an internal spring in the stylus. The stylus thus gives some resiliency when pulled against the cord, and this feature is used to tightly seat the stylus in the groove or channel recess so that it is stored with the cord under some tension.

18 Claims, 2 Drawing Sheets

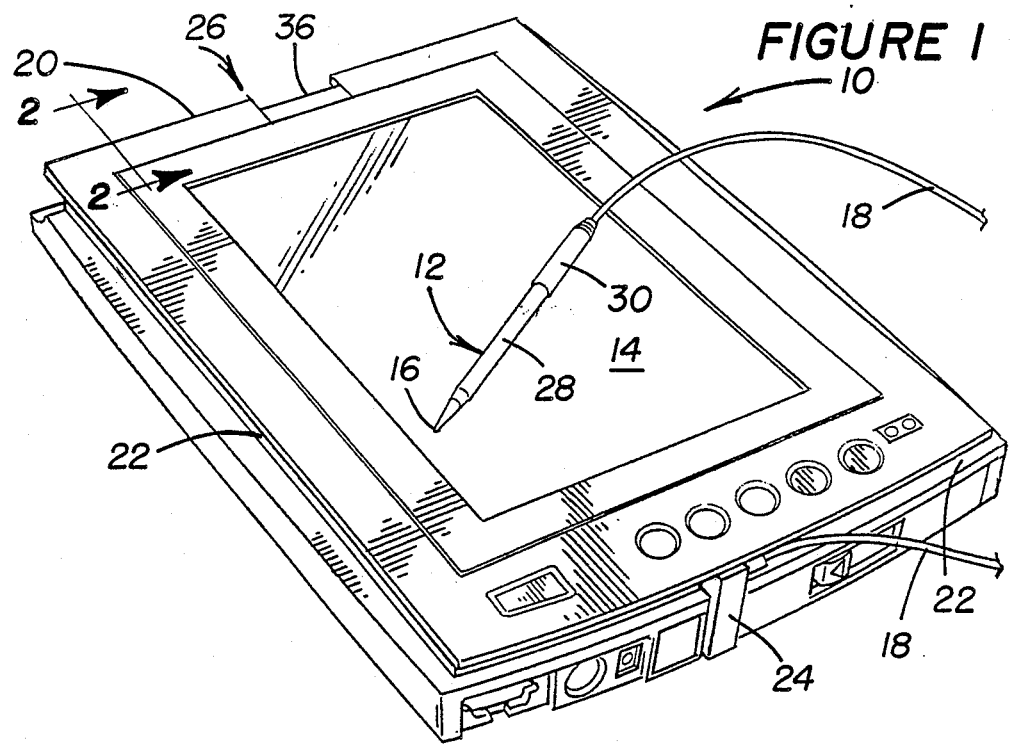
FIGURE 1
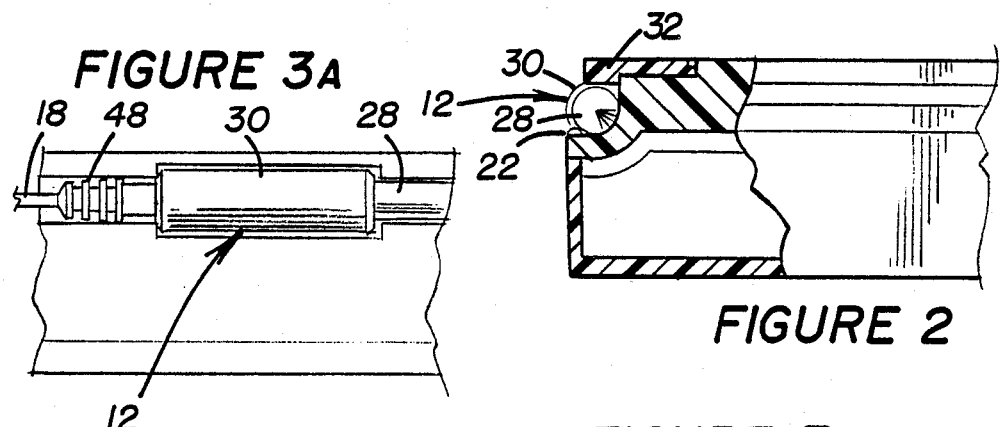
FIGURE 3A
FIGURE 2
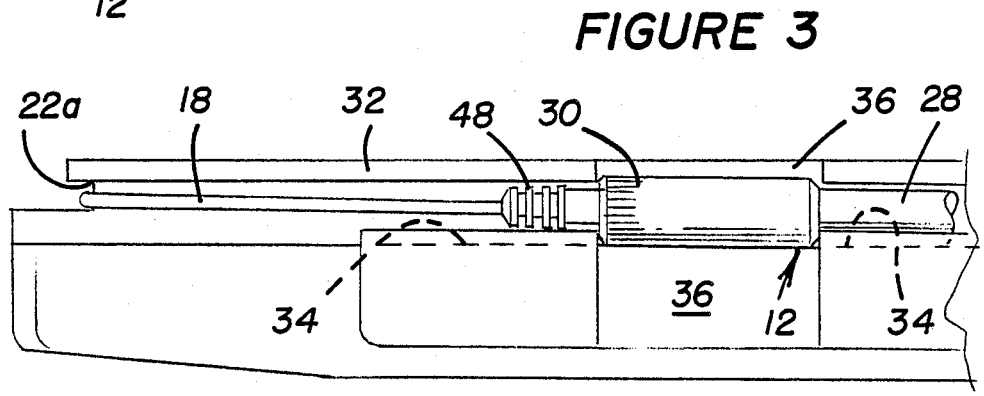
FIGURE 3

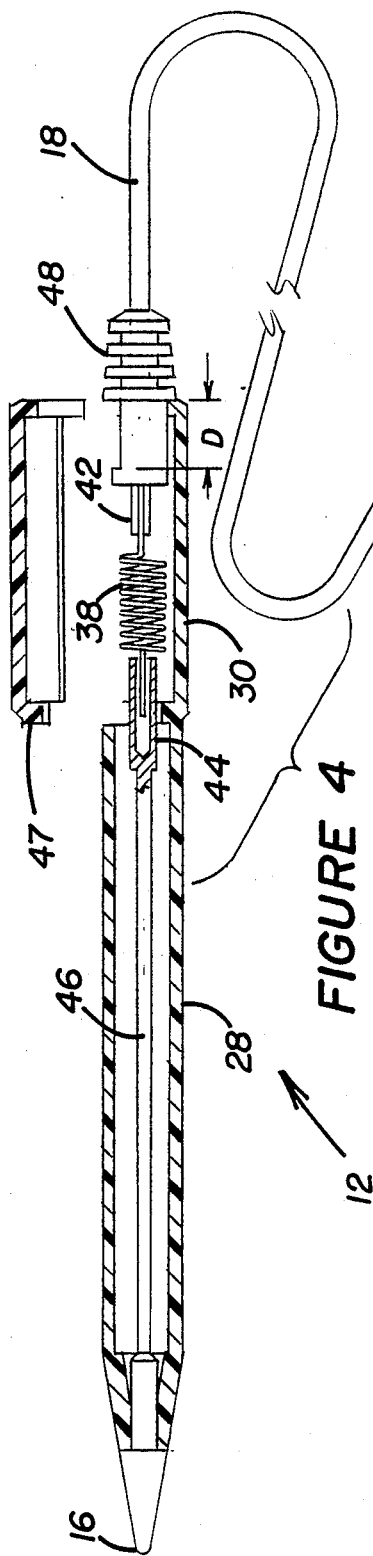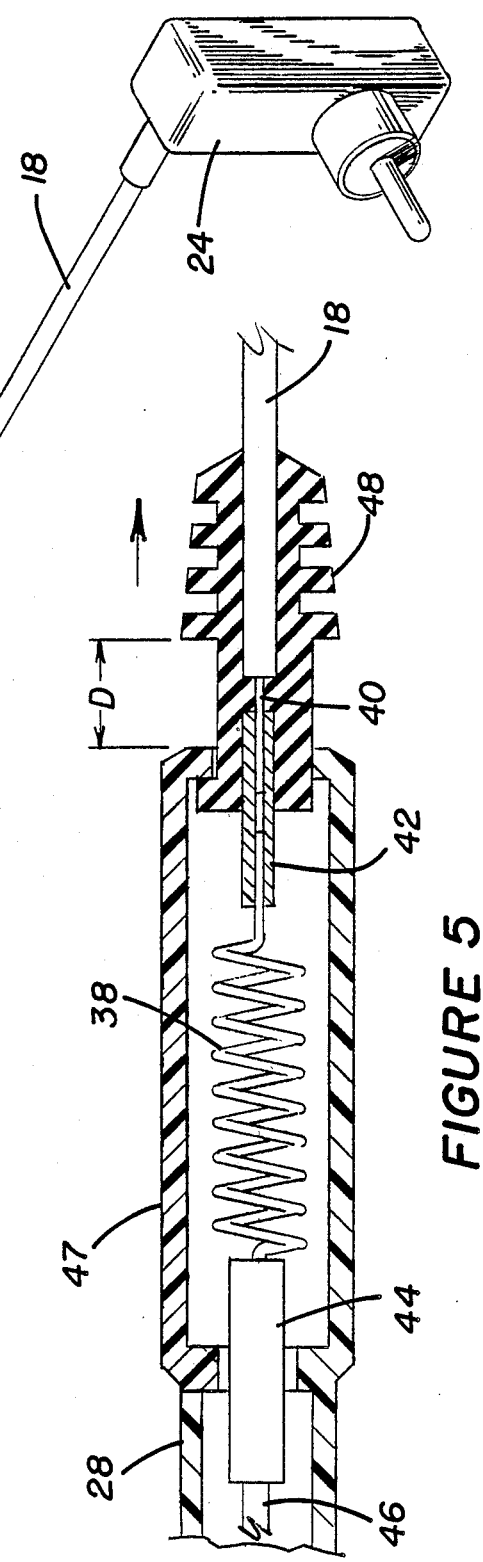

CONDUCTIVE STYLUS STORAGE FOR A PORTABLE COMPUTER

BACKGROUND OF THE INVENTION

The field of the invention is electrical devices having a writing stylus tethered thereto by a cord, particularly a computer to which a stylus is attached. The invention relates to an arrangement for storing the pen or conductive stylus on the computer. More broadly, the invention is concerned with storage of any pen type writing instrument on a tablet or clipboard structure having a writing surface.

Hand held computers have been developed primarily for the recording of information during field work. This includes uses by delivery people recording the delivery of inventory from a truck, inventory personnel in a warehouse or store, and other route type uses which could include reading of gas or water meters, etc. A copending application entitled "Hand Held Computer", filed concurrently with this application, assigned to the same assignee as the present invention and incorporated into this application by reference, discloses a hand held computer which has a large screen covering much of the area of the face of the computer, is thin in profile and light in weight and has no alphabetical or numerical keyboard. The hand held computer has a writing stylus or pen for writing on the screen, tethered to the computer housing by a cord which may carry a conductive wire, although in some applications no wire is needed.

It is an object of the present invention to provide an arrangement for conveniently and unobtrusively storing a pen or stylus and its cord on the outside of a hand held computer such as just described, for periods when the stylus is not being used. It is also an object of this invention to provide an arrangement for conveniently and unobtrusively storing a pen or stylus and its cord on the outside of any object or housing to which a pen or stylus is tethered.

SUMMARY OF THE INVENTION

In accordance with the present invention, a hand held computer has a conductive stylus and connected cord which are quickly and conveniently stored in a peripheral channel of the computer housing, provided by a terraced configuration of the housing.

The tethered pen or conductive stylus has a pen barrel with two diameters. A larger-diameter portion enables the pen to be firmly and positively located into place in a specific storage position of the housing's peripheral channel. The stylus storage channel is generally sized to accommodate the smaller-diameter major length of the pen or stylus, but has a notched out or larger area sized to receive the larger-diameter portion when the pen is laterally slipped into the channel. The pen or stylus thus has a shape that is exclusive to its function—the function of being readily stored in the channel formed in the computer housing—while still being shaped generally as a conventional pen for comfortable gripping and writing by the user.

In a preferred embodiment, the tethered pen or conductive stylus of the invention has an internal spring to which the pen cord is attached and which may form a part of the conductive linkage to the pen's tip. For storage of the pen in the recess or channel, the pen must be pulled lightly against the tethering cord, tensioning the internal spring. The pen is stored in this condition of tension in both the spring and the cord, thus firmly holding both the pen and the tethering cord in place in the computer's storage channel.

At the other end of the cord, a removable connector secures the cord to the computer and establishes the electrical connection between the computer and the stylus tip.

Another important benefit of the conductive stylus's internal spring is that it acts as a shock absorber in the event the stylus is pulled against the taut cord during use. The spring tensions (or compresses, depending upon the selected arrangement) and avoids damage to the cord's connection within the stylus and connection to the computer. It is therefore among the objects of the invention to improve over prior storage arrangements for tethered pens, conductive styluses and other such devices which enable a user to write on any portable device, including a hand held computer. Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the, appended claims.

BRIEF DESCRIPTION OF THE DRAWINGS

FIG. 1 is a perspective view showing a clipboard type or penboard type hand held computer having a tethered conductive stylus which can be stored on the computer housing in according with the principles of the present invention.

FIG. 2 is a sectional elevation view as seen along the line 2—2 in FIG. 1, showing storage of the tethered pen.

FIG. 3 is an elevation view, showing the pen or conductive stylus in its position of storage on the computer housing.

FIG. 3A is a view similar to FIG. 3 but showing a variation of the arrangement shown in FIG. 3.

FIG. 4 is a sectional view showing a preferred construction of the conductive stylus and showing the attached cord and end connector.

FIG. 5 is another sectional view showing a portion of the conductive stylus as seen in FIG. 4, and indicating the pen cord and a pen spring in tensioned configuration.

DETAILED DESCRIPTION OF THE PREFERRED EMBODIMENTS

In the drawings, FIG. 1 shows a hand held computer 10 of a construction which is disclosed in copending application Ser. No. 07/365,147 and which is exemplary of a device to which a tethered pen or stylus 12 may be secured and stored in accordance with the principles of the present invention.

The hand held computer 10 has a relatively large display screen 14 which is supported by appropriate software to enable the screen to be written upon using the tip 16 of the pen or conductive stylus 12. The pen or conductive stylus 12 is secured to the hand held computer 10 by a tethering cord 18 which may have an internal conductor electrically connecting the computer 10 to the stylus tip 16 to enable the screen write function. With some screen write technologies no conductor is needed in the cord.

In accordance with the invention, the computer 10 has a housing 20 with a generally terraced shape as shown along the upper edge of the housing. The terraced shape forms a channel 22 which preferably extends around the entire periphery of the computer, but which could extend through less than the entire periphery if desired. Other channel or groove configurations could be used, not necessarily with the illustrated terraced configuration.

As shown in FIG. 1 and 3, the pen cord 18 resides in a portion of the channel or groove 22 of the computer housing 20 when the pen is in a stored position. This portion 22A of the channel is narrower than the portion which holds the pen, as seen in FIG. 3. The cord 18 may have a computer end connector 24 as shown in FIGS. 1 and 4, whereby the cord 18 is positioned at the level of the channel 22.

When the user is finished entering written material into the computer by writing on the screen 14, the user pulls the pen or stylus 12 around the periphery of the computer 10 such that the cord 18 is pulled into the groove or channel 22 as the pen is moved to a distant end 26 of the computer wherein the pen is to be stored.

As shown in FIGS. 1, 2, 3, and 4, the conductive stylus or pen 12 has a barrel with two different diameters: A smaller diameter 28, preferably through the majority of the length of the stylus, and a larger diameter 30, which may be at the back end of the pen, from which the cord 18 extends. The smaller diameter major portion 28 is sized to fit into the housing channel or groove 22 at the distant end 26, between an upper flange 32 and a base surface or terrace 34 as shown in FIG. 3 and also in FIG. 2.

However, the larger diameter portion 30 is sized so as not to fit in the channel space 22 between the flange 32 and the terrace 34. The stylus 12 must be placed such that the larger diameter portion 30 resides in a notched area 36 which is formed in both the upper flange 32 and the terrace or base 34, as shown in FIG. 3. The notch 36 for the larger diameter portion of the pen barrel is also seen in FIG. 1.

The notch 36, as formed in both the upper flange 32 and the terrace 34, can comprise either a cut-out area wherein the flange and the terrace 34 simply recede back as shown in FIG. 3, so that the enlarged pen barrel portion 30 would be at least partially visible from above the computer; or it can comprise an area where the internal groove clearance between the flange 32 and the terrace surface 34 is widened, i.e. with the flange 32 thinner in that area, as shown in FIG. 3A. If this configuration is used, provision must be made for gripping the pen to remove it.

It is preferred that the tethering cord 18 be taut when the pen is properly placed in the storage position within the channel 22, so that the pen is positively and firmly retained within the channel. In a preferred embodiment of the invention, the conductive stylus or pen 12 is resiliently connected to the tethering cord 18, and this may be via a spring 38 internal to the pen, as shown in FIGS. 4 and 5. The spring 38 may be either a compression spring or a tension spring, but the embodiment illustrated in FIGS. 4 and 5 shows a tension spring 38. Another embodiment of the stylus and internal spring may be found in a copending application entitled "Pen Cord Tensioning Device", filed concurrently with this application, assigned to the same assignee as the present invention and incorporated into this application by reference.

The spring may also act as part of the conductive path from the computer connector 24 through the cord 18 to the conductive stylus tip 16. In one preferred construction as illustrated, a conductor wire 40 extending from the cord 18 is crimped or soldered within a conductive metal tube 42, which in turn is crimped or soldered onto a tail end of the spring 38. The other end of the spring 38 is connected to a tubular end portion 44 of an elongated conductor 46 which terminates at the conductive stylus tip 16 as shown. It may be integral with the top 16.

FIG. 4 shows a construction wherein the pen barrel is split at the larger diameter section 30, for assembly. A generally half-cylindrical section 47 is shown removed for access to the spring 38 and its conductive connections. FIG. 5 shows the section 47 in place in the pen barrel.

The conductive stylus tip 16 is configured so as to fit into and abut against a forward end of the narrow pen barrel portion 28 as shown in FIG. 4, providing a limit to movement of the tip and elongated conductor 46. The cord 18 can be pulled outwardly from the pen via a tail portion 48 of the pen, which is permitted outward movement through a distance D against the spring. When the pen or stylus 12 is pulled against the tethering cord 18, the internal spring 38 will extend, enabling the cord and tail end 48 to slide outwardly by the limited distance D.

Such a pulled position is shown in FIG. 5, wherein the tension spring 38 is shown extended. The elongated conductor 46 and the tubular end portion 44 remain in the same position, but the connector tube 42, the tail piece 48 and the cord 18 are pulled outwardly somewhat.

As mentioned above, the length of the cord is preferably selected so as to require some extension of the spring 38, with the cord 18 taut and properly positioned and seated within the channel 22, before the pen barrel can be inserted into the storage position shown in FIG. 3. This tends to hold the pen or stylus firmly in place, yet enables easy removal of the pen when desired for writing on the computer screen 14.

At the same time, as mentioned above, the inclusion of the resilient connection between the tethering cord 18 and the pen 12 protects the electrical connections of the cord within the pen and at the computer connection 24, against tugging which might otherwise damage the connections. In this sense, the resilient connection acts as a shock absorber.

It should be understood that the spring 38, shown in FIGS. 4 and 5 as a tension spring, could alternatively be a compression spring which would undergo compression when the pen is pulled against the tethering cord 18. The illustrated arrangement is preferred, however, principally because a simpler arrangement for continuity of the conductive path through the pen can be made with a tension spring acting as a conductor.

Although the invention is illustrated in the context of a portable computer, the principles of the invention can be applied to any hand held writing device having a pen or writing implement tethered by a cord to a frame or body having a writing surface for accepting writing from the implement. The terms "pen" or "stylus" as used herein and in the claims are intended broadly to include any writing implement suitable for the surface to be written upon, and the pen in some cases may not be a conductive stylus.

It should be understood that, although the pen or stylus 12 is shown with portions 30 and 28 of larger and smaller diameter, the basic principles of the invention also apply to a similar arrangement with a single-diameter pen 2. The single-diameter pen (not shown) can be placed in an expanded recess or cutout area 36 in the computer's channel 2, such that substantially the entire length of the pen (except for the tapered tip 16) just fits into the enlarged cutout space.

In the single-diameter embodiment the internal spring 38 or other resilient means can still be provided for providing a tension in the pen cord 18 and requiring a pulling of the pen in order to insert it in its storing recess. However, it should be understood that, in either embodiment, the spring 38 (or other internal spring means in the pen) can be eliminated and replaced by a springy resilience in the pen cord 18. This is particularly true in embodiments of devices wherein there is no metallic conductor wire inside the pen cord 18. Even where such a conductor wire is required, however, the resilience can nonetheless be provided in the cord by appropriate excess take-up length of the wire or intermittent coiled arrangements of the wire, for example.

While I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. A system for retention of a stylus on a housing comprising:
    a stylus;
    a housing having channel in one edge of the computer, providing a recess within which the stylus can be laterally inserted for storage, at a storage position;
    a tethering cord connected to the housing and to the stylus;
    the length of the tethering cord being just sufficient to allow the stylus to be inserted into said storage position with the tethering cord wrapped around the housing, from its point of connection to the housing to the stylus; and
    the stylus having a smaller diameter portion and a larger diameter portion, and the housing's channel being sized to receive the smaller diameter portion of the stylus, and having an enlarged slot area slightly longer than the enlarged diameter portion of the stylus and configured to receive the larger diameter portion to thereby positively locate the position of the stylus when it is inserted into the storage position in the housing's channel.

2. The invention defined in claim 1, wherein the stylus includes spring means connected to the tethering cord, for forming a resilient, yieldable connection between the tethering cord and the stylus, such that when the stylus is pulled against the taut tethering cord the cord will yield resiliently, pulling out somewhat from the stylus, thereby providing shock absorption to prevent damage to the connections of the cord to the housing and to the stylus when the stylus is pulled upon by a user.

3. The invention defined in claim 2, wherein the tethering cord is of a length such that the larger diameter portion of the stylus will reach the enlarged slot area of the computer's storage channel for insertion therein only if the stylus is pulled against the tethering cord causing said spring means to yield and to enable resilient extension of the stylus from the cord, whereby the stylus is positively and securely retained in the storage position in the channel by continuing tension in the spring means and in the tethering cord while the stylus is stored.

4. The invention defined in claim 3, wherein the channel extends around the housing from a position where the tethering cord is connected to the housing to the stylus storage position, and wherein the cord is of such a length that it must be engaged and stored in the channel in order for the stylus to reach the stylus storage position.

5. The invention defined in claim 4 wherein the tethering cord has an internal conductor wire electrically connecting the housing and the stylus.

6. The invention defined in claim 4 wherein the housing is a computer housing.

7. The invention defined in claim 1, wherein the channel extends around the housing from a position where the tethering cord is connected to the housing to the stylus storage position, and wherein the cord is of such a length that it must be engaged and stored in the channel in order for the stylus to reach the stylus storage position.

8. In a hand held tablet type writing device having a writing surface which can be written upon with a writing implement or pen, a system for retention of the pen to the writing device and for storage of the pen on the writing device when not in use, comprising,
    a channel in one edge of the tablet type writing device, providing a recess within which the pen can be laterally inserted for storage, at a storage position,
    a tethering cord connected to the writing device and to the pen,
    the length of the tethering cord being just sufficient to allow the pen to be inserted into said storage position with the tethering cord wrapped around the writing device, from its point of connection to the writing device to the pen, and
    the pen having a smaller diameter portion and a larger diameter portion, and the writing device's channel being sized to receive the smaller diameter portion of the pen and having an enlarged slot area slightly longer than the enlarged diameter portion of the pen and configured to receive the larger diameter portion to thereby positively locate the position of the pen when it is inserted into the storage position in the writing device's channel.

9. The invention defined in claim 8, wherein the channel extends around the writing device from a position where the tethering cord is connected to the writing device to the pen storage position, and wherein the cord is of such a length that it must be engaged and stored in the channel in order for the pen to reach the pen storage position.

10. The invention defined in claim 9, wherein the pen includes internal spring means connected to the tethering cord, for forming a resilient, yieldable connection between the tethering cord and the pen, such that when the pen is pulled against the taut tethering cord the cord will yield resiliently, pulling out somewhat from the pen, and wherein the tethering cord is of a length such that the larger diameter portion of the pen will reach the enlarged slot area of the writing device's storage channel for insertion therein only if the pen is pulled against the tethering cord causing said internal spring means to yield somewhat and to enable resilient extension of the pen from the cord, whereby the pen is positively and securely retained in the storage position in the channel by continuing tension in the spring means and in the tethering cord while the pen is stored.

11. In a hand held computer having a display screen which can be written upon with a pen or stylus, a system for retention of the stylus to the computer and for storage of the stylus on the computer when not in use, comprising,
- a channel in one edge of the computer, providing a recess within which the stylus can be laterally inserted for storage, at a storage position,
- a tethering cord connected to the computer and to the stylus,
- the length of the tethering cord being just sufficient to allow the stylus to be inserted into said storage position with the tethering cord wrapped around the computer, from its point of connection to the computer to the stylus, and
- means for retention of the stylus or pen in the storage position by preventing longitudinal movement of the stylus back toward the cord.

12. The apparatus of claim 11, wherein the means for retention comprises an enlarged slot area in the channel at said storage position for receiving the stylus.

13. The apparatus of claim 12, wherein the stylus has a smaller diameter portion and a larger diameter portion, and the computer's channel being sized to receive the smaller diameter portion of the stylus, and having an enlarged slot area slightly longer than the enlarged diameter portion of the stylus and configured to receive the larger diameter portion to thereby positively locate the position of the stylus when it is inserted into the storage position in the computer's channel.

14. The apparatus of claim 11, further including resilient means associated with the stylus and cord, for requiring the stylus to be pulled against the cord to put tension in the cord, in order for the stylus to reach the storage position in the channel, whereby the stylus is positively and securely retained in the storage position in the channel by continuing tension in the cord while the stylus is stored.

15. In a hand held tablet type writing device having a writing surface which can be written upon with a writing implement or pen, a system for retention of the pen to the writing device and for storage of the pen on the writing device when not in use, comprising,
- a channel in one edge of the tablet type writing device, providing a recess within which the pen can be laterally inserted for storage, at a storage position,
- a tethering cord connected to the writing device and to the pen,
- the length of the tethering cord being just sufficient to allow the pen to be inserted into said storage position with the tethering cord wrapped around the writing device, from its point of connection to the writing device to the pen, and
- means for retaining the pen in the storage position by preventing longitudinal movement of the pen back toward the cord.

16. The apparatus of claim 15, wherein the pen has a smaller diameter portion and a larger diameter portion, and the writing device's channel being sized to receive the smaller diameter portion of the pen and having an enlarged slot area slightly longer than the enlarged diameter portion of the pen and configured to receive the larger diameter portion to thereby positively locate the position of the pen when it is inserted into the storage position in the writing device's channel.

17. The invention defined in claim 16, wherein the channel extends around the writing device from a position where the tethering cord is connected to the writing device to the pen storage position, and wherein the cord is of such a length that it must be engaged and stored in the channel in order for the pen to reach the pen storage position.

18. The apparatus of claim 15, further including resilient means associated with the pen and cord, for requiring the pen to be pulled against the cord to put tension in the cord, in order for the pen to reach the storage position in the channel, whereby the pen is positively and securely retained in the storage position in the channel by continuing tension in the cord while the pen is stored.

* * * * *